United States Patent [19]

Koga

[11] Patent Number: 5,600,518
[45] Date of Patent: Feb. 4, 1997

[54] MAGNETORESISTIVE HEAD HAVING A STEPPED MAGNETORESISTIVE FILM ELEMENT

[75] Inventor: Naoki Koga, Tamana, Japan

[73] Assignee: Matsushita Electric Industrial Co., Ltd., Osaka, Japan

[21] Appl. No.: 216,387

[22] Filed: Mar. 23, 1994

[30] Foreign Application Priority Data

Mar. 24, 1993 [JP] Japan .................................. 5-064937

[51] Int. Cl.$^6$ ....................................................... G11B 5/39
[52] U.S. Cl. ................................................................ 360/113
[58] Field of Search ........................ 360/113; 338/32 R; 324/207.21

[56] References Cited

U.S. PATENT DOCUMENTS 4,967,298  10/1990  Mowry ..................................... 360/113
5,325,253   6/1994  Chen et al. .............................. 360/113

*Primary Examiner*—A. J. Heinz
*Assistant Examiner*—George J. Letscher
*Attorney, Agent, or Firm*—Lowe, Price, LeBlanc & Becker

[57] ABSTRACT

A magnetoresistive head for use in, for example, a magnetic recording/reproducing device such as a magnetic disc unit is provided. This magnetoresistive head includes a substrate, a magnetoresistive element film, first and second antiferromagnetic films, and a first and second lead layers mounted on the first and second antiferromagnetic films for supplying a sense current to the magnetoresistive element film. The magnetoresistive element film includes first and second stepped side portions each having a thickness smaller than that of a central portion of the magnetoresistive element film which defines a reproducing section. The first and second antiferromagnetic films are formed on the first and second stepped side portions of said magnetoresistive element film. With these arrangements, the Barkhausen noise is reduced greatly while maintaining a reproduced output voltage at a desired level.

26 Claims, 5 Drawing Sheets

MAGNETORESISTIVE HEAD HAVING A STEPPED MAGNETORESISTIVE FILM ELEMENT

BACKGROUND OF THE INVENTION

1. Technical Field of the Invention

The present invention relates generally to a magnetoresistive head which may be employed in a magnetic recording/reproducing device such as a magnetic disc unit.

2. Background Art

Recently, metal thin film discs exhibiting high coercive force, high residual magnetic flux density, and low noise properties have been developed. In addition, magnetic heads such as a metal-in gap head, a thin film head, or a laminated type magnetic head formed with laminated metal magnetic films, have also been developed These magnetic heads all utilize the electromagnetic induction, and thus their reproduced outputs vary in proportional to a relative speed between the magnetic head and the magnetic disc. Therefore, the reduction in diameter of a magnetic disc causes the reproduced output to be degraded. For avoiding this drawback, a magnetoresistive head is employed which changes its electrical resistivity on application of a magnetic field from a magnetic disc.

FIG. 8 shows a conventional shielded magnetoresistive head. This magnetoresistive head includes generally a NiFe-made magnetoresistive element (MR element) 1, FeMn-made antiferromagnetic films 2, leads 3 applying a current to the MR element, a soft magnetic film 4 providing a bias magnetic field to the MR element 1, an intermediate layer 5 magnetically insulating the MR element 1 from the soft magnetic film 4, magnetic shielding members 6 and 7, an insulating layer 8 insulating the soft magnetic film 4 from the magnetic shielding member 6, and an insulating layer 9 insulating the leads 3 from the magnetic shielding member 7.

In operation when a sense current is applied to one of the leads 3, it will flow to the MR element 1 through the antiferromagnetic films 2 and then is directed to the other of the leads 3. The sense current flowing through the MR element 1 is separated toward the soft magnetic film 4 and the intermediate layer 5 according to a resistance ratio in the MR element 1, the soft manegnetic film 4, and the intermediate layer 5. The soft magnetic film 4 and the intermediate layer 5 are usually made of material showing a greater resistivity than that of the MR element 1. Thus, most of the sense current flows through the MR element 1.

When the sense current flows through a reproducing portion 1a defined by a central portion of the MR element 1 along an easy axis of magnetization, as shown by arrow in the drawing, it will cause the soft magnetic film 4 beneath the intermediate layer 5 to be magnetized. The magnetized soft magnetic film 4 then produces a bias magnetic field acting on the MR element 1.

Additionally, when a magnetic field produced by a magnetic flux of a signal recorded on a magnetic recording medium is applied to the MR element 1 along a hard axis perpendicular to the easy axis of magnetization, it will cause the MR element 1 to be changed in electrical resistivity. This change is detected as a reproduced output voltage.

It will be thus appreciated that it is possible to detect the magnetic flux generated from the magnetic recording medium to derive the reproduced output voltage regardless of relative speed between the magnetic recording medium and the head.

The above prior art magnetoresistive head, however, has suffered from the drawback in that the increase in thickness of the MR element 1, as shown in FIG. 9, causes the reproducing portion 1a to be magnetized easily to form multi-domains. This leads to irregular displacements of magnetic domain walls due to the magnetic field of the signal from the magnetic recording medium, causing the frequency of the Barkhausen noise appearing on the reproduced waveform to be increased undesirably. Conversely, the decrease in thickness of the MR element 1 alleviates this problem, but however, it causes, as shown in FIG. 10, the MR ratio to be reduced, resulting in the reproduced output voltage being lowered.

SUMMARY OF THE INVENTION

It is therefore a principal object of the present invention to avoid the disadvantages of the prior art.

It is another object of the present invention to provide a magnetoresistive head which is designed to reduce the Barkhausen noise greatly, while providing a sufficient reproduced output voltage.

According to one aspect of the present invention, there is provided a magnetoresistive head which comprises a magnetoresistive element film including first and second stepped portions each having a thickness smaller than that of a third portion defining a portion of the magnetoresistive element film other than the first and second stepped portions, first and second antiferromagnetic films provided on the first and second stepped portions of the magnetoresistive element film, and first and second lead layers mounted on the first and second antiferromagnetic films for supplying a sense current to the magnetoresistive element film.

According to another aspect of the invention, there is provided a magnetoresistive head which comprises a substrate, a first magnetic shielding member arranged on the substrate, a magnetoresistive element film provided on the first magnetic shielding member, the magnetoresistive element film including first and second stepped portions each having a thickness smaller than that of a third portion defining a portion of the magnetoresistive element film other than the first and second stepped portions, first and second antiferromagnetic films provided on the first and second stepped portions of the magnetoresistive element film, first and second lead layers mounted on the first and second antiferromagnetic films for supplying a sense current to the magnetoresistive element film, and a second magnetic shielding member arranged on the first and second lead layers.

According to a further aspect of the invention, there is provided a magnetoresistive head which comprises a magnetoresistive element film, the magnetoresistive element film including first and second stepped portions arranged to define a central portion of the magnetoresistive element film, the first and second stepped portions each having a thickness smaller than that of the central portion, first and second antiferromagnetic films provided on the first and second stepped portions of the magnetoresistive element film, and first and second lead layers mounted on the first and second antiferromagnetic films for supplying a sense current to the magnetoresistive element film.

According to a still further aspect of the invention, there is provided a magnetoresistive head which comprises a substrate, a first magnetic shielding member arranged on the substrate, a magnetoresistive element film provided on the first magnetic shielding member, the magnetoresistive element film including first and second stepped portions provided to define a central portion of the magnetoresistive element film, the first and second stepped portions each having a thickness smaller than that of the central portion, first and second antiferromagnetic films provided on the first and second stepped portions of the magnetoresistive element film, first and second lead layers mounted on the first and second antiferromagnetic films for supplying a sense current to the magnetoresistive element film, and a second magnetic shielding member arranged on the first and second lead layers.

In the preferred mode, a difference in thickness between the first and second stepped portions and the central portion is less than or equal to 50% of the thickness of the central portion.

In addition, the difference in thickness between the first and second stepped portions and the central portion preferably be more than 20 Å.

The first and second lead layers may be attached to both the magnetoresistive element film and the first and second antiferromagnetic films, respectively.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for the purpose of explanation and understanding only.

In the drawings.

DESCRIPTION OF THE PREFERRED EMBODIMENT

Figure 1:
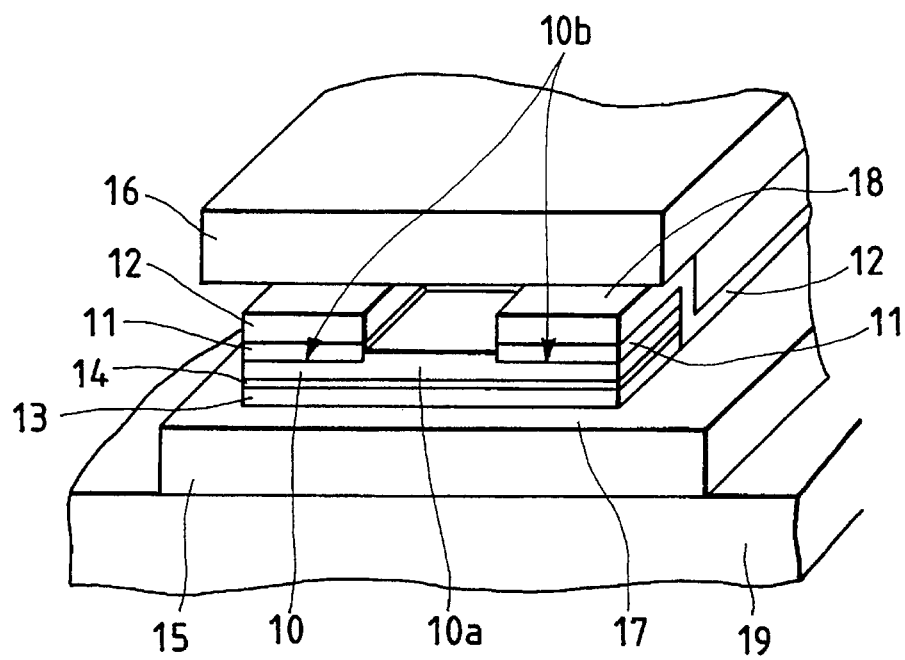
FIG. 1 is a partially perspective view which shows a magnetoresistive head, as viewed from a reproducing medium.

Referring now to the drawings, wherein like numbers refer to like parts in several views, particularly to FIG. 1, there is shown a magnetoresistive head according to the present invention which may be employed in a magnetic recording apparatus such as a magnetic disc unit.

The magnetoresistive head includes generally a substrate 19, a magnetic shielding member 15, an insulating layer 17, a soft magnetic film 13, a magnetoresistive element (MR element) 10, an intermediate layer 14, a reproducing portion 10a, a pair of antiferromagnetic films 11, a pair of leads 12, an insulating layer 18, and a magnetic shielding member 16.

The substrate 19 is made of a ceramic material such as $Al_2O_3$ TiC. The magnetic shielding member 15 is made of a magnetic material such as FeAlSi or NiFe, and is formed on the substrate 19 to a thin film of the order of 1–5 μm. The insulating layer 17 is made of an insulating material such as $SiO_2$, and formed on the magnetic shielding member 15. The soft magnetic film 13 is made of a soft magnetic material such as an amorphous alloy producing a bias magnetic field. The MR element 10 is made of a magnetoresistive material such as NiFe assuming the magnetoresistive effect, and is formed on the soft magnetic film 13 through the intermediate layer 14 which is made of such as Ti or Ta. The reproducing portion 10a is designed to be sensitive to a magnetic flux generated from a magnetic recording medium (not shown). The MR element 10, as can be seen in the drawings, includes stepped portions 10b on its both sides to define therebetween the reproducing portion 10a thicker than the stepped portions 10b. The antiferromagnetic films 11 are made of FeMn, and formed on the stepped portions 10a of the MR element 10, respectively. The leads 12 are made of a conductive material such as Au or W for applying a sense current to the MR element 10. The intermediate layer 14 is provided for magnetically insulating the MR element 10 from the soft magnetic film 13. The insulating layer 18 is made of an insulating material such as $SiO_2$, and provided on the leads 12 and the MR element 10. Note that in FIG. 1, the insulating layer 18 is not shown for the sake of clarification of a connecting structure between the leads 12 and the MR element 10. The magnetic shielding member 16 is made of a magnetic material such as FeAlSi or NiFe, and is formed on the insulating layer 18 into a thin film using such as the sputtering method.

The operation of the thus-constructed magnetoresistive head will be discussed below.

When a sense current is applied to one of the leads 12, it will flow to the MR element 10 through the antiferromagnetic films 11 and then is directed to the other of the leads 12. The sense current flowing through the MR element 10 is further separated toward the soft magnetic film 13 and the intermediate layer 14 according to a resistance ratio among the MR element 10, the soft magnetic film 13, and the intermediate layer 14. The soft magnetic film 13 and the intermediate layer 14 are usually made of material exhibiting a greater resistivity than that of the MR element 10. Thus, most of the sense current flows through the MR element.

When the sense current flows through the reproducing portion 10a of the MR element 10 along an easy axis of magnetization, it will cause the soft magnetic film 13 beneath the intermediate layer 14 to be magnetized. The magnetized soft magnetic film 13 then produces a bias magnetic field acting on the MR element 10.

Additionally, when a magnetic field produced by a magnetic flux of a signal recorded on a magnetic recording medium (not shown) is applied to the MR element 10 along a hard axis perpendicular to the easy axis of magnetization, it will cause the MR element 10 to be changed in electrical conductivity. This change is detected as a reproduced output voltage.

Referring to FIGS. 2 to 7, there are shown manufacturing processes of the magnetoresistive head of the invention.

Figure 2:
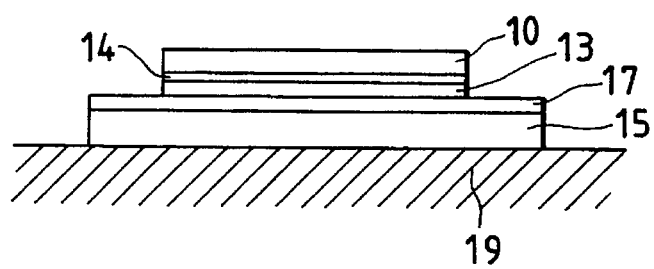
FIGS. 2 to 7 are front views which show manufacturing processes of a magnetoresistive head of the invention.

Initially, as shown in FIG. 2, NiFe or FeAlSi material is deposited on the ceramic-made substrate 19 using the sputtering or plating process to form the magnetic shielding member 15.

On the magnetic shield member 15 thus formed, the insulating layer 17 made of SiO₂ is formed using the sputtering method. On the insulating layer 17, the soft magnetic film 13 is formed using the sputtering method. On the soft magnetic film 13, the intermediate layer 14 made of SiO₂, Al₂O₃, Ti, or Ta is formed using the sputtering method. Further, on the intermediate layer 14, the MR element made of such as NiFe is formed using the sputtering method.

Figure 3:
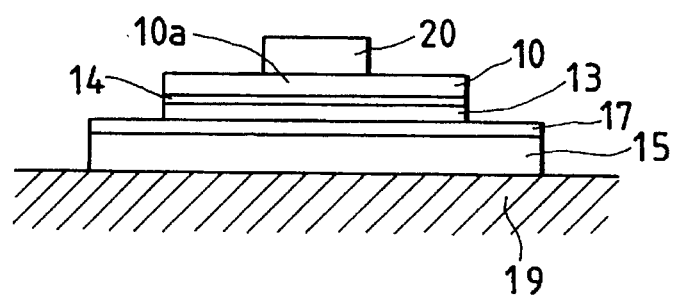
Figure 4:
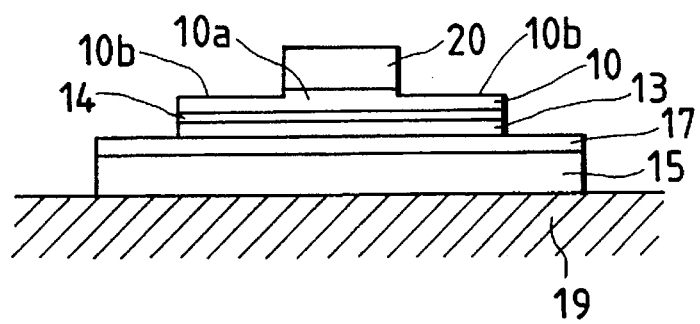
Figure 5:
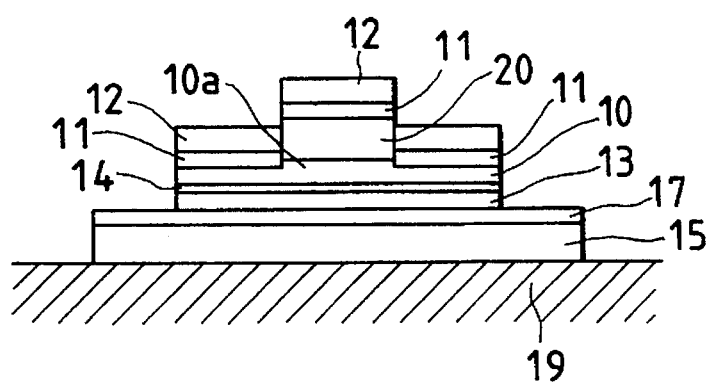
Figure 6:
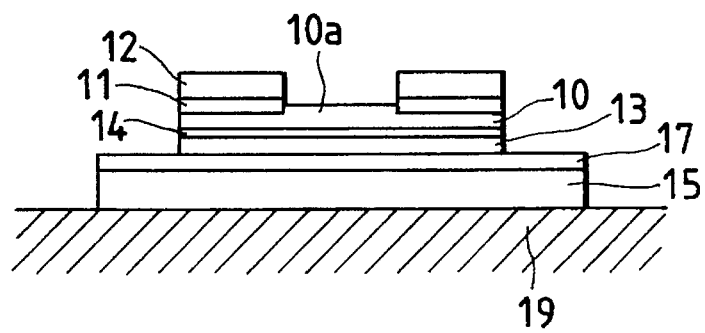
Figure 7:
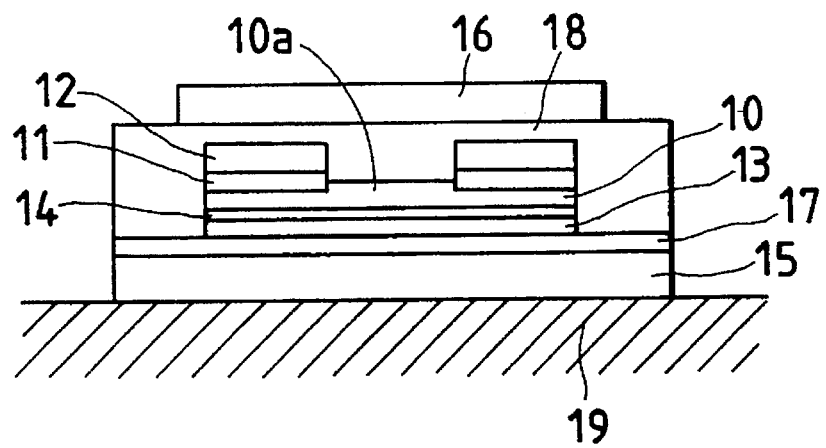

Subsequently, as shown in FIG. 3, the reproducing portion 10a of the MR element 10 is covered with a protective member 20 such as resist. Both side portions of the MR element 10, as shown in FIG. 4, are then partly removed by the etching process, leaving the resist-covered portion to form the stepped portions 10b. As shown in FIG. 5, on the stepped portions 10b, the antiferromagnetic films 11 made of FeMn are formed using the sputtering or vacuum deposition process. Similarly, the leads 12 made of Au or W are formed on the antiferromagnetic films 11 using the sputtering or vacuums deposition process. Afterwards, as show in FIG. 6, the protective member 20 on the reproducing portion 10a of the MR element 10 is removed along with unwanted portions of antiferromagnetic film 11 and the lead 12 formed on the protective member 20. Finally, as shown in FIG. 7, the insulating layer 18 is provided on the leads 12 using the sputtering process. On the insulating layer 18, the magnetic shielding member 16 is formed.

Figure 11:
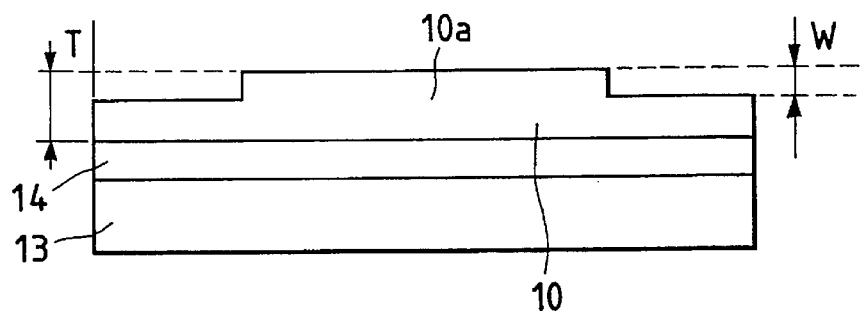
FIG. 11 is a partially cross-sectional view which shows a thickness relation between a reproducing portion and stepped portions of an MR element.

It is advisable that a difference in thickness W between the reproducing portion 10a and the stepped portions 10b of the MR element 10, as shown in FIG. 11, be less than or equal to 50% of the thickness T of the MR element 10 according to the following relation.

$$W < 0.5 \times T$$

$$(T > 40 \text{ Å})$$

It has been found that the difference in thickness W more than half of the thickness of the MR element 10 will adversely increase the Barkhausen noise. In addition, it is preferable that a lower limit of the difference in thickness W be set to 20 Å. This is because the provision of the difference in thickness W more than 20 Å makes it possible to remove an oxide film or dirt on an interface between the stepped portions 10b of the MR element 10 and the antiferromagnetic films 11.

Figure 8:
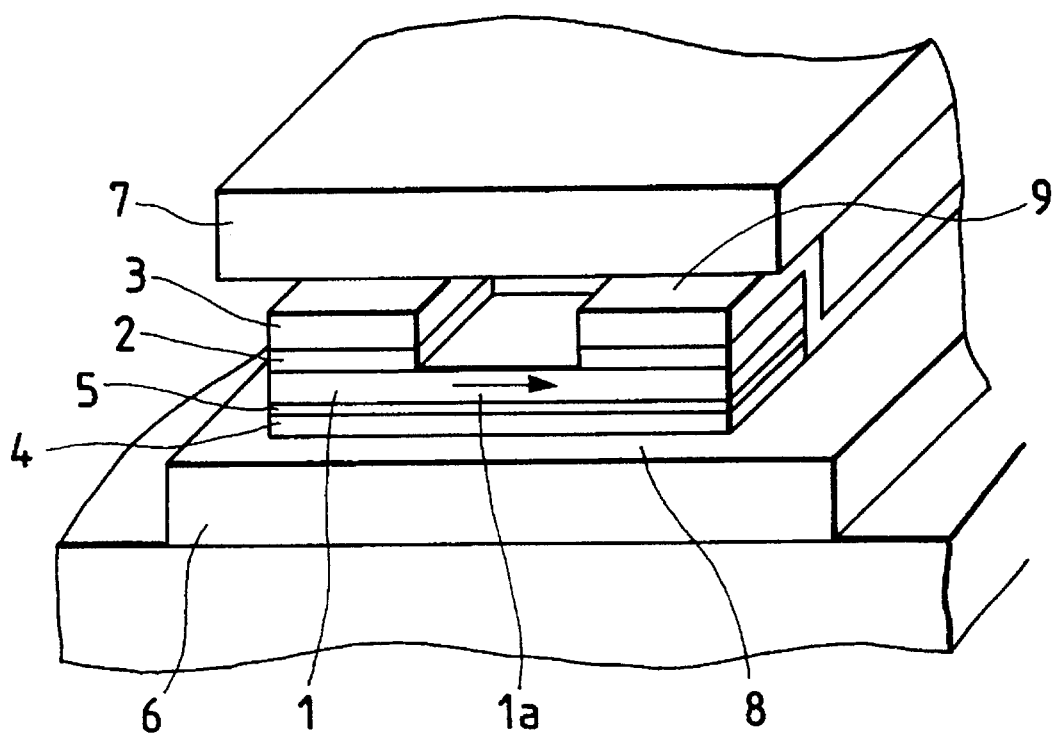
FIG. 8 is a partially perspective view which shows a conventional magnetoresistive head.

Comparison tests were performed with respect to the magnetoresistive head of the invention and a conventional magnetoresistive head, as shown in FIG. 8. In the tests, recording signals having a frequency of 4 MHz were recorded on a 1.8-inch disc using a separate recording head. Reproducing characteristics were measured at a location of a radius of 11.6 mm on the disc rotating at a peripheral speed of 4,37 m/s using the head including the reproducing portion 10a of a width of 5 μm. In addition, the Barkhausen noise is measured based on the reproduced waveform of a solitary wave written on the disc.

Figure 9:
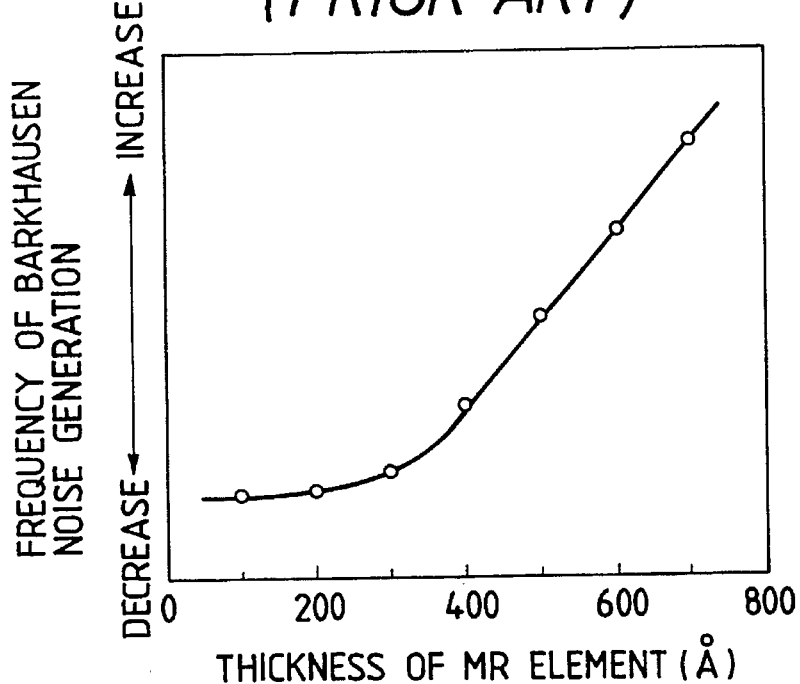
FIG. 9 is a graph which shows a relation between the frequency of the Barkhausen noise being generated and the thickness of an MR element of the conventional magnetoresistive head, as shown in FIG. 8.
Figure 10:
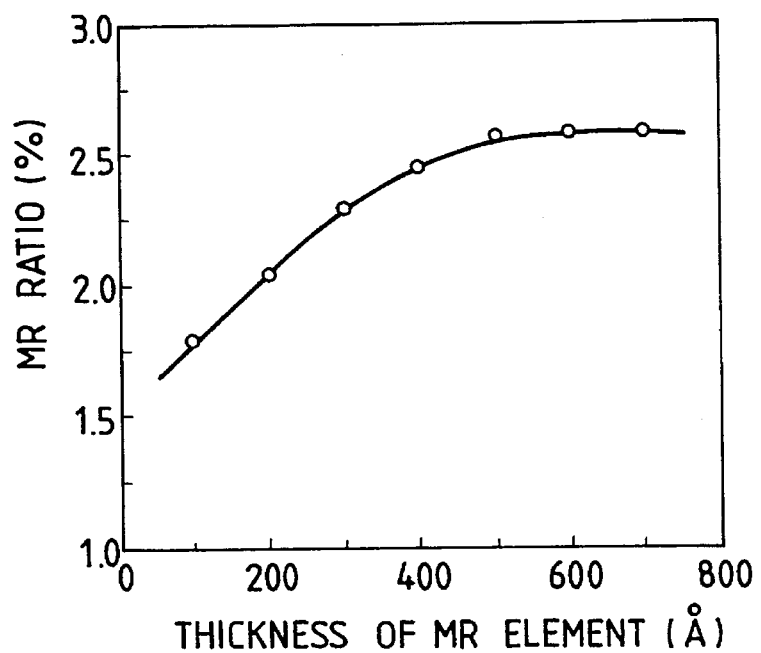
FIG. 10 is a graph which shows a relation between an MR ratio and the thickness of an MR element of the conventional magnetoresistive head, as shown in FIG. 8.

FIGS. 9 and 10 show the results of the tests using the conventional magnetoresistive head, as shown in FIG. 8. The test results show that the conventional magnetoresistive head having the 300 Å-thick MR element 1 provides a sufficient reduction in the Barkhausen noise, however, a reproduced output voltage shows a lower value of 0.23 mV. Additionally, it is found that as the thickness of the MR element 1 of the conventional magnetoresistive head is increased, the frequency of the Barkhausen noise being generated becomes great. For example, when the thickness of the MR element is 500 Å, the frequency of the Barkhausen noise being generated is greatly increased, and the reproduced output voltage varies over a range of 0.25 mV to 0.30 mV.

In contrast, the magnetoresistive head of the present invention including the reproducing portion 10a of the MR element 10 having a thickness of 500 Å and the stepped portions having a thickness of 300 Å greatly reduces the frequency of the Barkhausen noise being generated, and provides a stable reproduced output voltage of 0.30 mv.

While in the above embodiment, the substrate 19 is, as already mentioned, made of a ceramic material, and the magnetic shielding member 15 is provided with a magnetic film made of NiFe or FeAlSi formed on the substrate 19, the substrate 19 may alternatively be made of a MnZn ferrite or a NiZn ferrite. In this case, the substrate 19 also functions as a magnetic shielding member and thus, the magnetic shielding member 15 may be omitted. Additionally, the magnetoresistive head, as shown, is of a SAL (Soft Adjacent Layer) bias type, however, it may be of any other known bias type, for example, a shunt bias.

Figure 12:
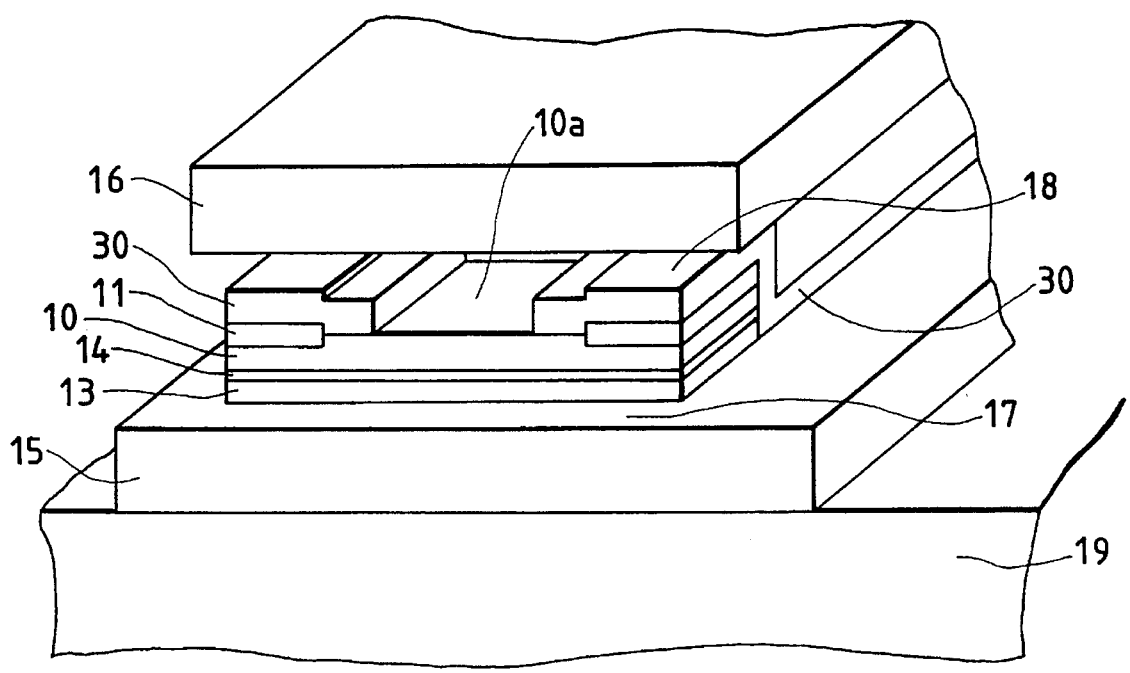
FIG. 12 is a partially perspective view which shows an alternative embodiment of a magnetoresistive head according to the invention.

Referring to FIG. 12, there is shown an alternative embodiment of the magnetoresistive head according to the invention. The same reference numbers as employed in the first embodiment refer to common structural elements.

The magnetoresistive head of this embodiment includes a substrate 19, a magnetic shielding member 15, an insulating layer 17, a soft magnetic film 13, a magnetoresistive element (MR element) 10, an intermediate layer 14, a reproducing portion 10a, antiferromagnetic films 11, a pair of lead layers 30, an insulating layer 18, and a magnetic shielding member 16.

The lead layers 30 are made of a conductive material such as Au, and formed using the gilding process so as to be bounded to both the antiferromagnetic films 11 and the MR element 10, respectively. This arrangement reduces an electrical resistance greatly as compared with the arrangement in the first embodiment. The reduction in electrical resistance serves to decrease the noise, thereby enhancing the performance of the magnetoresistive head.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims. For example, on the magnetic shielding member 16, a recording element may be arranged for recording data on a magnetic recording medium.

What is claimed is:

1. A magnetoresistive head comprising:

a magnetoresistive element film including first and second opposed surfaces and first and second stepped portions formed on said first surface each of said first and second stepped portions having a thickness smaller than that of a third portion defined on said first surface of said magnetoresistive element film, said third portion being other than the first and second stepped portions, said second surface portion of said magnetoresistive element being flat;

first and second antiferromagnetic films provided on the first and second stepped portions of said magnetoresistive element film; and first and second lead layers mounted on said first and second antiferromagnetic films for supplying a sense current to said magnetoresistive element film.

2. A magnetoresistive head as set forth in claim 1, wherein a difference in thickness between the first and second stepped portions and the third portion is less than or equal to 50% of the thickness of the third portion.

3. A magnetoresistive head as set forth in claim 2, wherein the difference in thickness between the first and second stepped portions and the third portion is more than 20 Å.

4. A magnetoresistive head as set forth in claim 1, wherein sad first and second lead layers are attached to both said magnetoresistive element film and said first and second antiferromagnetic films, respectively.

5. A magnetoresistive head as set forth in claim 4, wherein a difference in thickness between the first and second stepped portions and the third portion is less than or equal to 50% of the thickness of the third portion.

6. A magnetoresistive head as set forth in claim 5, wherein the difference in thickness between the first and second stepped portions and the third portion is more than 20 Å.

7. A magnetoresistive head comprising:

a substrate;

a first magnetic shielding member arranged on said substrate;

a magnetoresistive element film provided on said first magnetic shielding member, said magnetoresistive element film including first and second opposed surfaces, said second surface being flat, said magnetoresistive element having first and second stepped portions formed on said first surface, each of said first and second stepped portions having a thickness smaller than that of a third portion defined on said first surface of said magnetoresistive element film, said third portion being other than the first and second stepped portions;

first and second antiferromagnetic films provided on the first and second stepped portions of said magnetoresistive element film;

first and second lead layers mounted on said first and second antiferromagnetic films for supplying a sense current to said magnetoresistive element film; and a second shielding member arranged on said first and second lead layers.

8. A magnetoresistive head as set forth in claim 7, wherein a difference in thickness between the first and second stepped portions and the third portion is less than or equal to 50% of the thickness of the third portion.

9. A magnetoresistive head as set forth in claim 8, wherein the difference in thickness between the first and second stepped portions and the third portion is more than 20 Å.

10. A magnetoresistive head as set forth in claim 7, wherein said first and second lead layers are attached to both said magnetoresistive element film and said first and second antiferromagnetic films, respectively.

11. A magnetoresistive head as set forth in claim 10, wherein a difference in thickness between the first and second stepped portions and the third portion is less than or equal to 50% of the thickness of the third portion.

12. A magnetoresistive head as set forth in claim 11, wherein the difference in thickness between the first and second stepped portions and the third portion is more than 20 Å.

13. A magnetoresistive head comprising:

a magnetoresistive element film, said magnetoresistive element film including a first surface and a flat second surface opposed to said first surface, said magnetoresistive element film having first and second stepped portions formed on said first surface and positioned to define a central portion of said magnetoresistive element film on said first surface, the first and second stepped portions each having a thickness smaller than that of the central portion;

first and second antiferromagnetic films provided on the first and second stepped portions of said magnetoresistive element film; and first and second layers mounted on said first and second antiferromagnetic films for supplying a sense current to said magnetoresistive element film.

14. A magnetoresistive head as set forth in claim 13, wherein a difference in thickness between the first and second stepped portions and the central portion is less than or equal to 50% of the thickness of the central portion.

15. A magnetoresistive head as set forth in claim 14, wherein the difference in thickness between the first and second stepped portions and the central portion is more than 20 Å.

16. A magnetoresistive head as set forth in claim 13, wherein said first and second lead layers are attached to both said magnetoresistive element film and said first and second antiferromagnetic films, respectively.

17. A magnetoresistive head as set forth in claim 16, wherein a difference in thickness between the first and second stepped portions and the central portion is less than or equal to 50% of the thickness of the central portion.

18. A magnetoresistive head as set forth in claim 17, wherein the difference in thickness between the first and second stepped portions and the central portion is more than 20 Å.

19. A magnetoresistive head comprising:

a substrate;

a first magnetic shielding member arranged on said substrate;

a magnetoresistive element film having first and second opposed surfaces, said second surface being flat and facing said first magnetic shielding member, said magnetoresistive element film including first and second stepped portions provided on said first surface which define a central portion of said magnetoresistive element film, the first and second stepped portions each having a thickness smaller than that of the central portion;

first and second antiferromagnetic films provided on the first and second stepped portions of said magnetoresistive element film;

first and second lead layers mounted on said first and second antiferromagnetic films for supplying a sense current to said magnetoresistive element film; and a second shielding member arranged on said first and second lead layers.

20. A magnetoresistive head as set forth in claim 19, wherein a difference in thickness between the first and second stepped portions and the central portion is less than or equal to 50% of the thickness of the central portion.

21. A magnetoresistive head as set forth in claim 20, wherein the difference in thickness between the first and second stepped portions and the central portion is more than 20 Å.

22. A magnetoresistive head as set forth in claim 19, wherein said first and second lead layers are attached to both said magnetoresistive element film and said first and second antiferromagnetic films, respectively.

23. A magnetoresistive head as set forth in claim 22, wherein a difference in thickness between the first and second stepped portions and the central portion is less than or equal to 50% of the thickness of the central portion.

24. A magnetoresistive head as set forth in claim 23, wherein the difference in thickness between the first and second stepped portions and the central portion is more than 20 Å.

25. A magnetoresistive head comprising;

a magnetoresistive element film including first and second stepped portions which define a central portion of said magnetoresistive element film, the first and second stepped portion each having a thickness which is smaller that a thickness of said central portion;

first and second antiferromagnetic films provided on the first and second stepped portions of said magnetoresistive element film respectively; and first and second lead layers mounted on said first and second antiferromagnetic films for supplying a sense current to said magnetoresistive element film, said first and second lead layers being positioned over said first and second stepped portions of said magnetoresistive element film so as to leave only said central portion of said magnetoresistive element film exposed.

26. A magnetoresistive head as set forth in claim 25, wherein said magnetoresistive element film has a first surface and a flat second surface which are opposed to each other, said first and second stepped portion and said central portion being formed on said first surface.

* * * * *